June 7, 1955  L. A. ERICKSON  2,709,916
THRUST MEASURING DEVICE
Filed June 3, 1952  7 Sheets-Sheet 1

INVENTOR
LEONARD A. ERICKSON
BY Toulmin & Toulmin
ATTORNEYS

June 7, 1955

L. A. ERICKSON 2,709,916

THRUST MEASURING DEVICE

Filed June 3, 1952

INVENTOR
LEONARD A. ERICKSON
BY Toulmin & Toulmin
ATTORNEYS

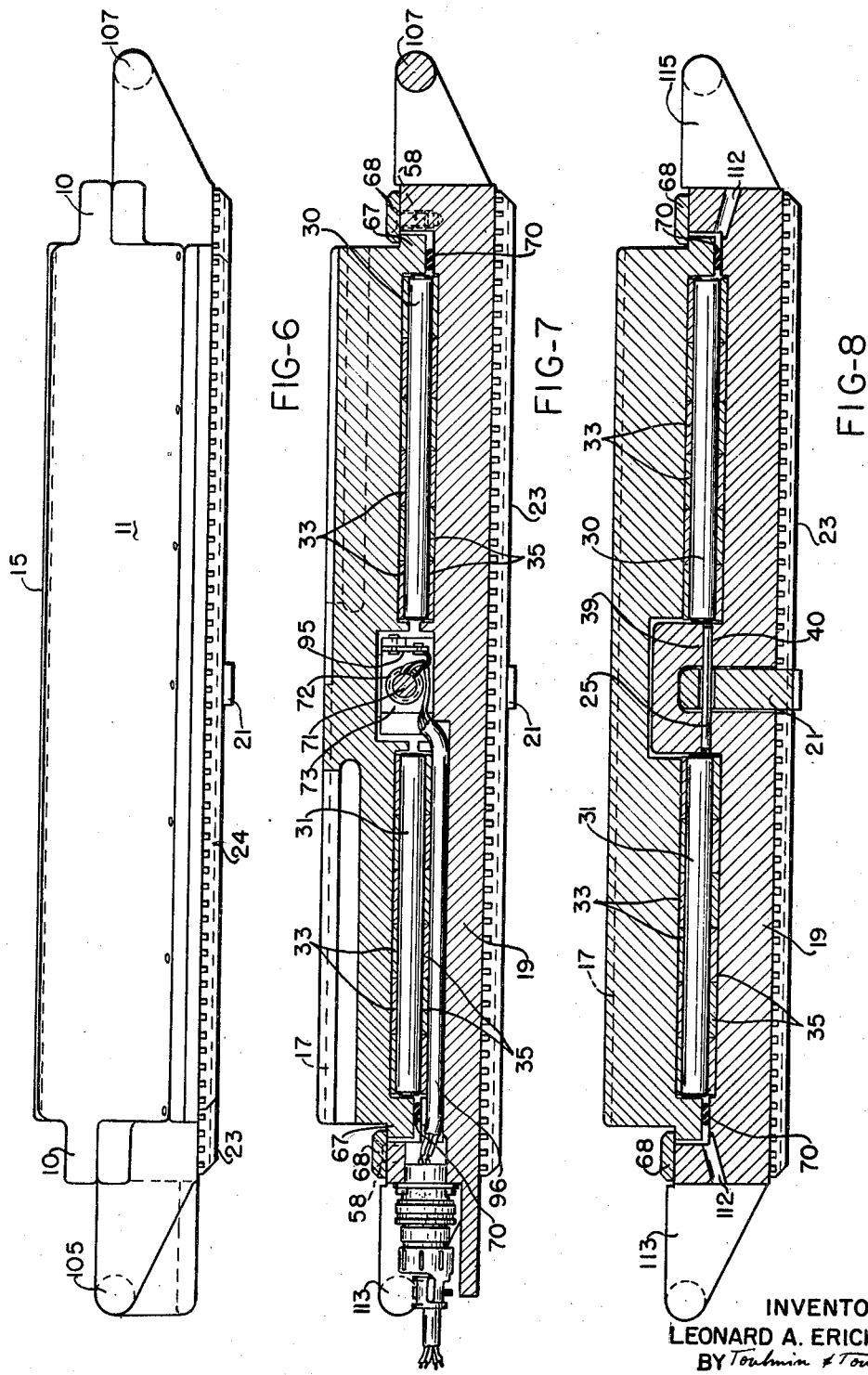

June 7, 1955 L. A. ERICKSON 2,709,916
THRUST MEASURING DEVICE
Filed June 3, 1952 7 Sheets-Sheet 5
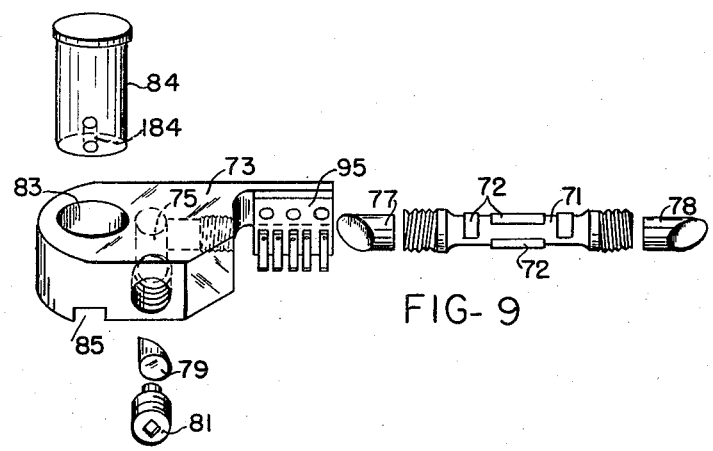
FIG-9
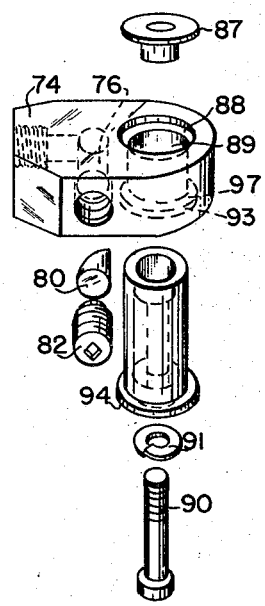
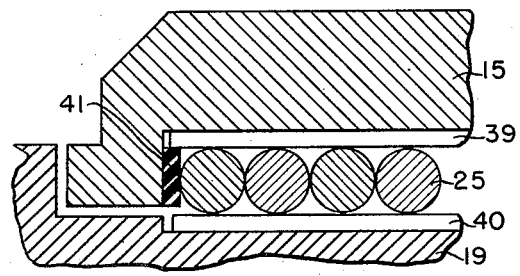
FIG-10
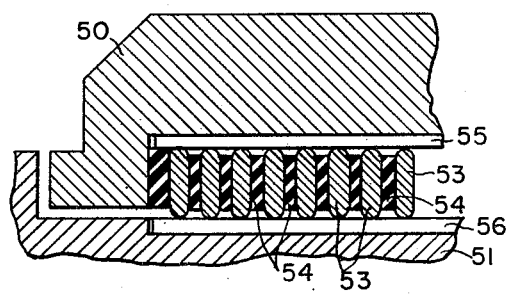
FIG-11
INVENTOR
LEONARD A. ERICKSON
BY Toulmin & Toulmin
ATTORNEYS INVENTOR
LEONARD A. ERICKSON
BY Toulmin & Toulmin
ATTORNEYS June 7, 1955   L. A. ERICKSON   2,709,916
THRUST MEASURING DEVICE
Filed June 3, 1952   7 Sheets-Sheet 7
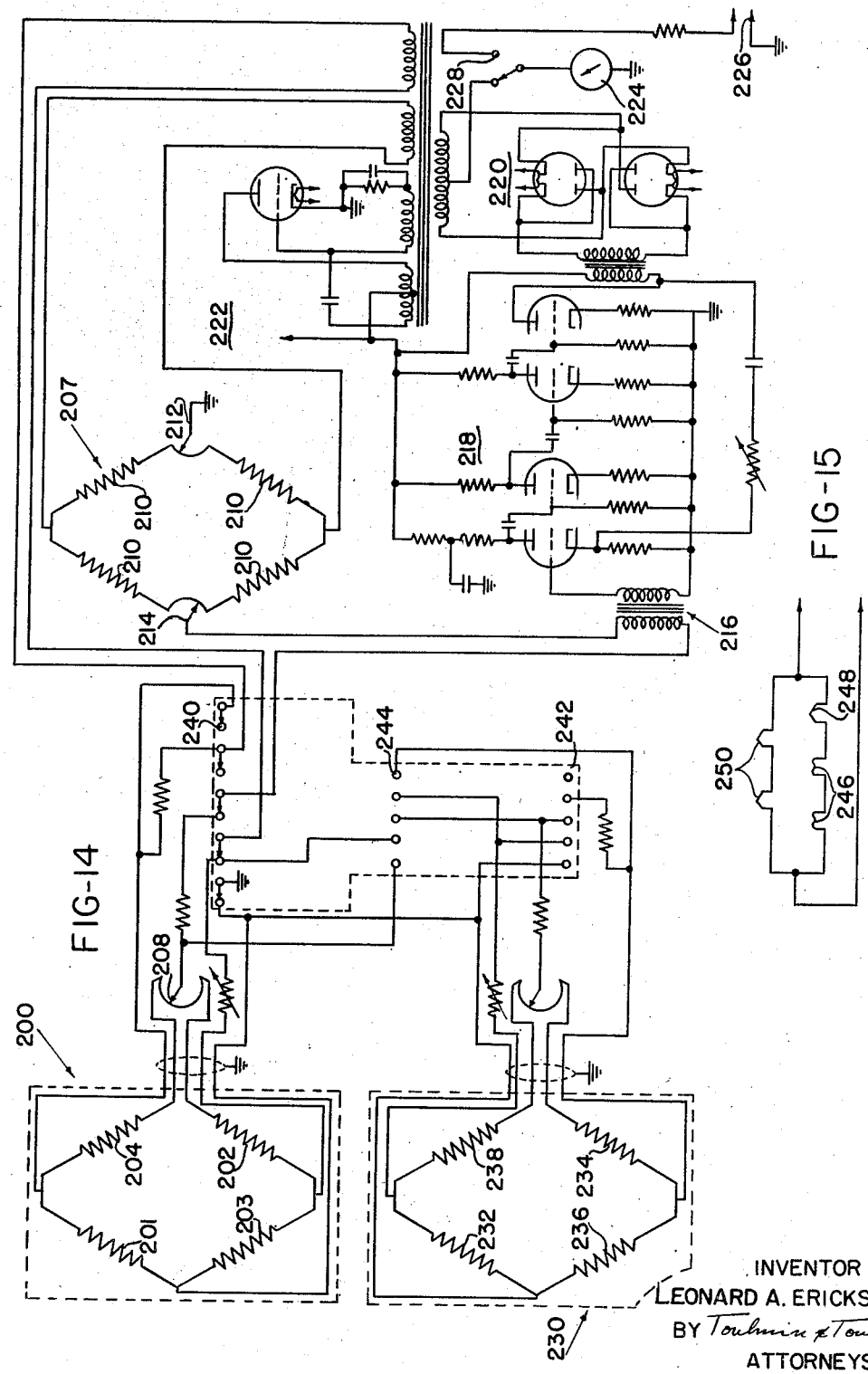
INVENTOR
LEONARD A. ERICKSON
BY Toulmin & Toulmin
ATTORNEYS

United States Patent Office 2,709,916
Patented June 7, 1955

2,709,916

THRUST MEASURING DEVICE

Leonard A. Erickson, Dayton, Ohio, assignor to The Commonwealth Engineering Company of Ohio, Dayton, Ohio, a corporation of Ohio Application June 3, 1952, Serial No. 291,387

8 Claims. (Cl. 73—141)

This invention relates to thrust measuring devices and more particularly to thrust measuring structures which are required to support very large vertical loads while permitting measurement of a thrust applied to the load in a horizontal direction. Still more particularly the invention relates to a structure useful for the measurement of the forward thrust of an airplane.

In general the structure of invention comprises a platform upon which the wheel of a plane may rest in a locked position; this platform is movable to a limited extent and is supported on a bearing assembly which in turn is supported by a fixedly positioned base plate mounted on for example an airport runway. One end portion of the platform and an adjacent end portion of the base plate are connected together by a tension member which is itself provided with strain gauges which are electrically connected to an amplifier and appropriate meter. Movement of the platform on the bearings in response to an applied force will cause the tension member to be stressed and the amount of change as indicated by the amplifier and meter will be a direct indication of the amount of force applied to the movable platform. In practice one thrust measuring device is placed under each wheel of an airplane and the combined thrust loads are recorded on the indicating meter.

Accordingly a primary object of this invention is to provide a thrust measuring device which is extremely sensitive to thrust forces acting in a horizontal direction with a minimum of relative movement between parts of the device which consequently minimizes and substantially renders nil friction forces and losses which would affect measurements.

An important object of the invention is to provide a novel bearing assembly capable of sustaining extremely large vertical forces while providing a minimum resistance, which for most purposes may be regarded as nil, to small movements in a horizontal direction.

It is another object of this invention to provide a novel mounting for a tension member which permits of self alignment of the member.

These and other allied objectives of the invention are attained as shown in the preferred embodiments described more completely hereinafter in connection with the accompanying drawings wherein:

Figure 6 is a right hand end view of Figure 3;

Figure 7 is a view taken on line 7—7 of Figure 3;

Figure 8 is a view taken on line 8—8 of Figure 3;

Figure 9 is an exploded view illustrating the components of the tension member of the structure of invention;

Figure 10 is a sectional view illustrating one form of bearing assembly;

Figure 14 is a schematic view of the electrical ciruit of the meter; and

Figure 15 illustrates a portion of the electrical circuit arrangement.

Figure 1:
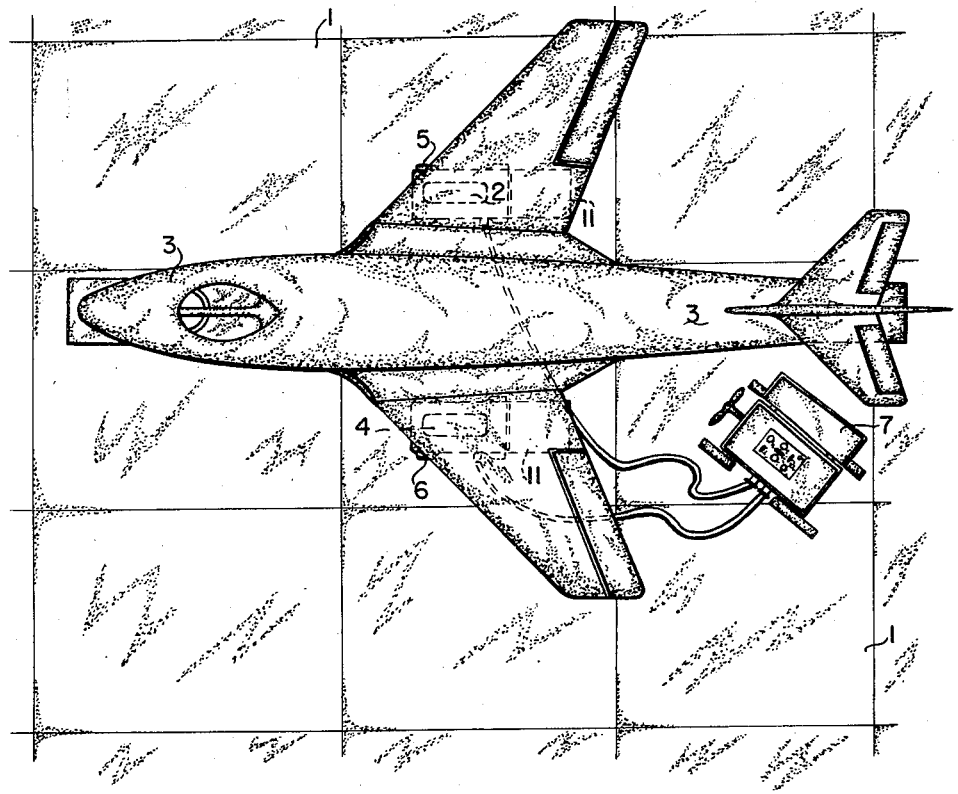
Figure 1 is a plan view of an airplane mounted on thrust measuring devices of the invention.

Referring now to the drawings there is shown in Figure 1 a runway 1 having a plane 3 thereon the wheels 2, 4 of which are supported respectively by thrust measuring devices 5, 6 connected electrically to an electron amplifier and meter 7. Unit 7 may be any standard instrument capable of measuring electrical circuit changes upon application of a force to a strain gauge and will be referred to more particularly hereinafter. The wheels of the plane may be blocked as at 9 (Figure 2), or if preferred the frictional resistance of a grooved surface as at 17 in Figure 3 may be relied upon if so desired.

Figure 3:
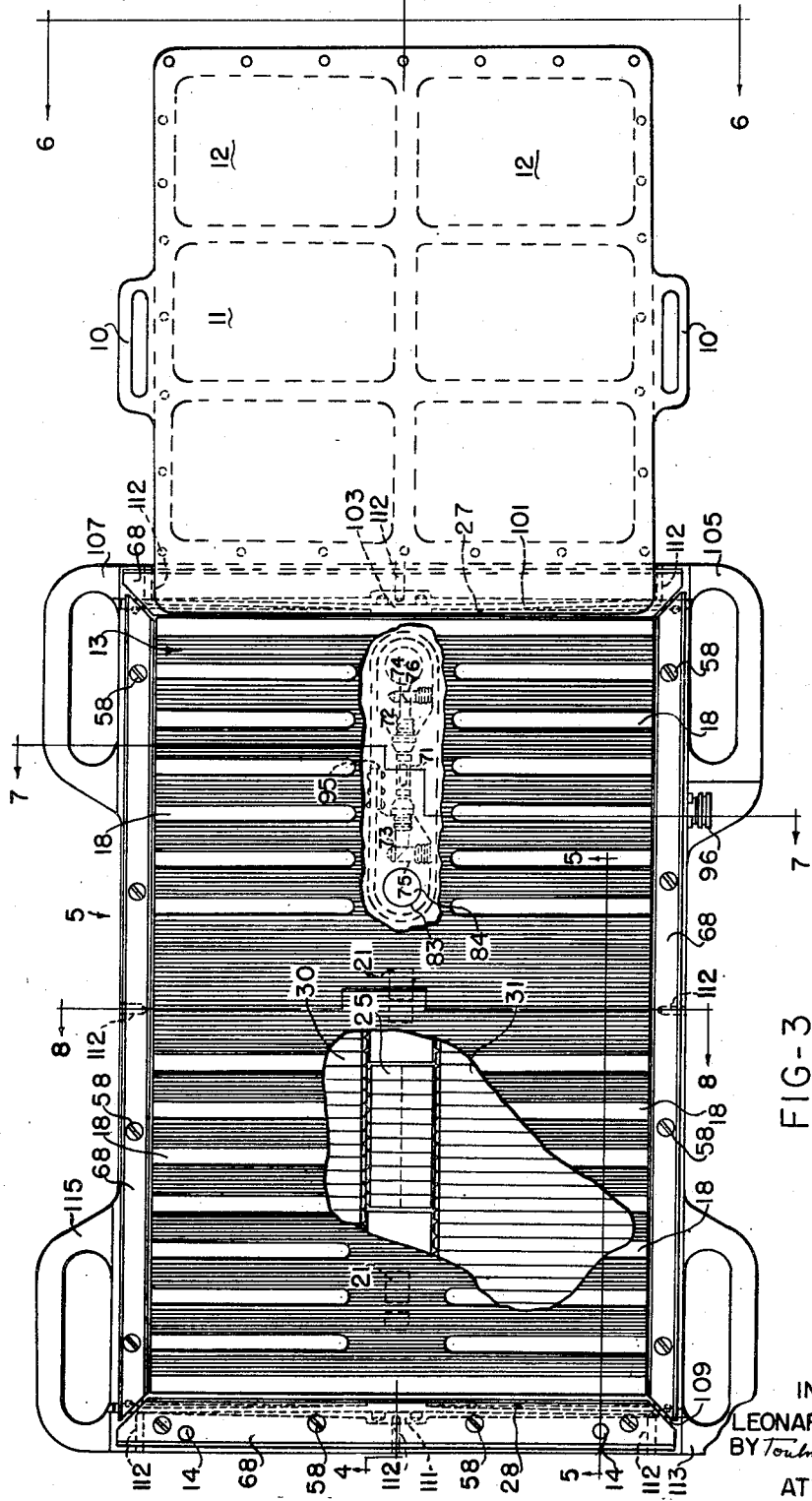
Figure 3 is a plan view, with portions broken away, of the device of invention.
Figure 4:
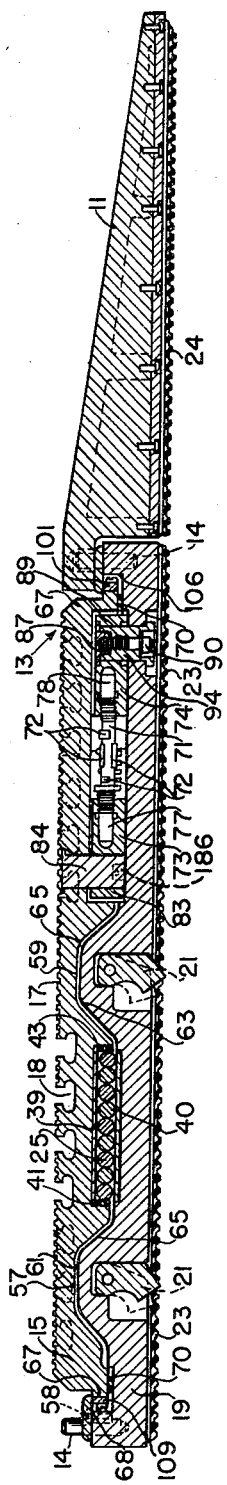
Figure 4 is a sectional view taken on line 4—4 of Figure 3.

As shown in Figure 3 each thrust measuring device 5, 6 comprises a ramp portion 11 having handles 10 and cut out portions 12 and this ramp is suitably secured to an end 13 of the device as by dowel means 14 (Figure 4). It will be noted a pair of dowels 14 is positioned on the forward as well as the rearward end and the ramp may be secured to either as required.

Figure 2:
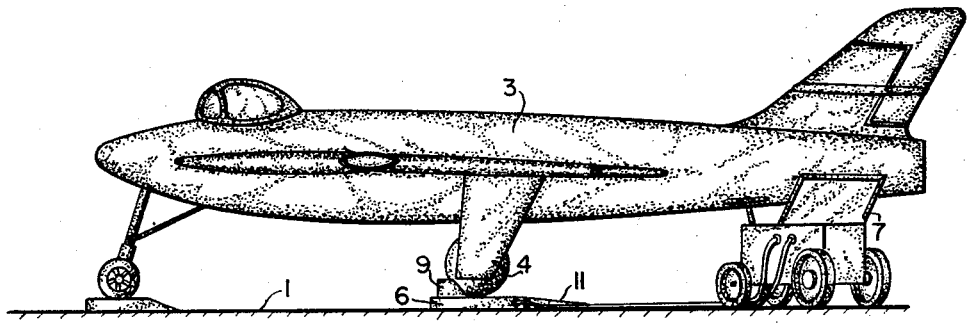
Figure 2 is an elevational view of the structure of Figure 1.

The measuring device itself comprises a platform portion (Figure 4) grooved as at 17 to provide a frictional surface and slotted as at 18 for the receipt of blocking members such as 9 in Figure 2.

Spaced vertically below platform 15 is a base plate 19 provided on the bottom side and centrally thereof with pivoted fingers 21 which are adapted to extend and engage the surface of a runway to prevent motion of the base plate. The bottom of this plate also has cemented thereto and extending over substantially the whole area thereof a heavy layer 23 of antiskid neoprene. A similar layer 24 is secured on the bottom of ramp 11. Longitudinally base plate 19 extends at each end slightly beyond platform 15 as will be noted more particularly hereinafter.

Figure 5:
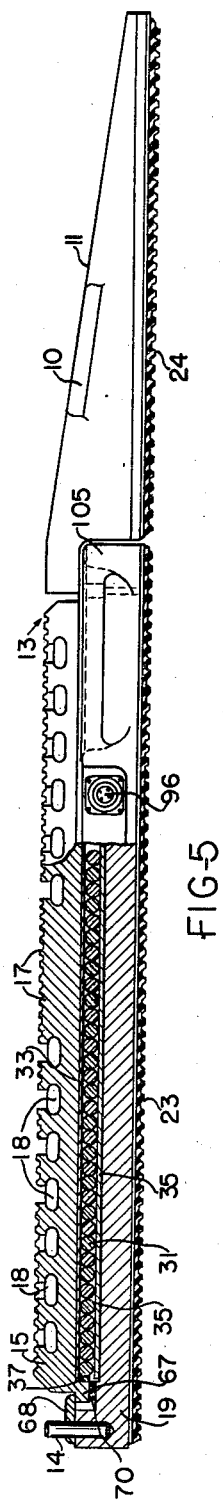
Figure 5 is a view partially in section taken on line 5—5 of Figure 4.

Between the platform and base plate (Figure 3) are positioned sets of roller bearings indicated at 25, 30 and 31. Bearing sets 30 and 31 are similar, each roller being of considerable length and the bearing being contacted by an upper and lower series of hardened steel plates 33, 35 of suitable width (Figures 5 and 7) the first series of which is secured to the lower face of the platform and the second series of which is secured to the upper face of the base plate. Each end roller of a set is contacted by a neoprene strip as at 37 which strip is secured to the platform and extends laterally thereof thus serving as an aligning medium.

Bearings 25 are positioned centrally and forwardly and are similar to the others except that they are shorter in length and the assemblies do not extend rearwardly over the unit as do the roller bearings just described, but are limited in extent by the tension member assembly. Roller bearings 25 (Figure 10) however are similarly mounted between hardened steel plates 39, 40 and are enclosed on the ends by laterally extending neoprene strips 41, 43.

It will thus be noted that a very large bearing area has been provided for the movement of platform 15 with respect to base plate 19.

As has been noted the motion of platform 15 with respect to base plate 19 is very slight being at full load only about .015". To insure that the movement is restricted and to prevent damage in case of structural failure of the tension member assembly to be described hereinafter, platform 15 centrally of the width thereof is provided forward and aft of bearing assembly 25 with recesses 57, 59 into which projections 61, 63 of base plate 19 protrude. These projections do not contact plate 15 but are separated therefrom by channel 65 (Figure 4) and contact will occur only in case of structural failure in which event undue motion of platform 15 will be arrested.

The platform 15 (Figure 4) is also provided with a protuberance 67, which extends around the platform periphery adjacent and below lips 68 secured to base plate 19 by screws 58 and undue forward movement of platform 15 as well as any lifting of platform 15 will be restricted thereby. The channel 65 is closed adjacent this protuberance 67 by a neoprene strip 70 which prevents entrance of moisture to the unit. The protuberance 67, lip 68 and strip 70 extend substantially completely around the periphery or may be sectioned conveniently for application to the device. However similar numerals have been used for these components in the various figures of the drawings.

Referring now to Figure 9 the tension member assembly comprises a force sensing element or tension member 71 consisting of a rod of steel having a zero thermo elastic coefficient, i. e. a Young's modulus which is a constant. Such a steel is produced by the H. A. Wilson Co. under the trade name "Nispan-C." Rod 71 has positioned about the working circumference thereof four bonded wire strain gauges indicated at 72. The rod 71 is also threaded at opposing ends for receipt into blocks 73, 74, apertures 75, 76 receiving faced members 77 and 78, respectively, which are engaged by faced members 79, 80 and held in position respectively by set screws 81, 82, respectively. These faced members lock the tension member 71 in an axial direction.

Block 73 is provided with a bore 83 which receives solid cylindrical member 84 and which engages with block 73 at 85. For this purpose member 84 is apertured transversely therethrough at 184 to receive a pin 186 (Figure 4) which pin passes into the block through 85. Member 84 thus engages the block and also the platform 15 and moves with the latter when force is applied to the structure.

Similarly, block 74 is engaged by base plate 19 by means of collar 87 which is drawn down adjacent shoulder 88 of bore 89 by passing machine screw 90 through lock washer 91 and hollow cylindrical member 94 to engage threads in collar 87. Member 94 is of course held stationary during this assembly. Bore 89 is provided with a shoulder 93 on which the member 94 is received.

It is to be noted that collar 87 does not rest upon shoulder 88 but is spaced slightly therefrom in the threaded position so that collars 94 and 87 may turn slightly in the bore 89 thus rendering block 74 movable in a horizontal plane. Thus the assembly of elements 90, 91, 94 and 87 may move vertically slightly in bore 89 but is retained by plate 19 from excessive movement.

Referring briefly to Figure 4 it will be noted that when platform 15 moves leftwardly rod 71 is tensioned and the degree of tension will be reflected in the strain gauges 72 changing their electrical characteristics. To transmit the electrical signals to the amplifier and meter 7 the strain gauges 72 are connected to the terminal board 95 (Figure 9) and the signals are led out through the electrical conduit 96 (Figure 7) which conduit passes through an opening in the base plate 19. Connection is made to the amplifier and meter in the manner known to the art.

Figure 11:
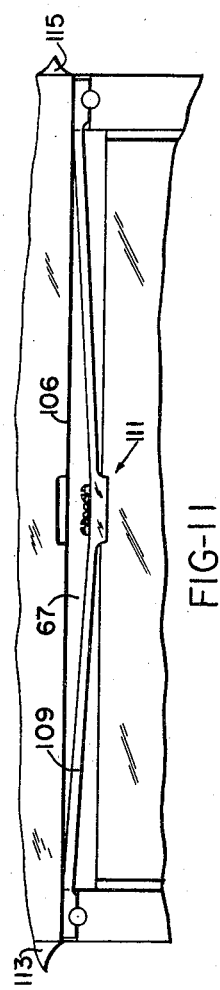
Figure 11 is a plan view on an enlarged scale of a portion of the left hand end of Figure 3 with protecting elements cut away.
Figure 12:
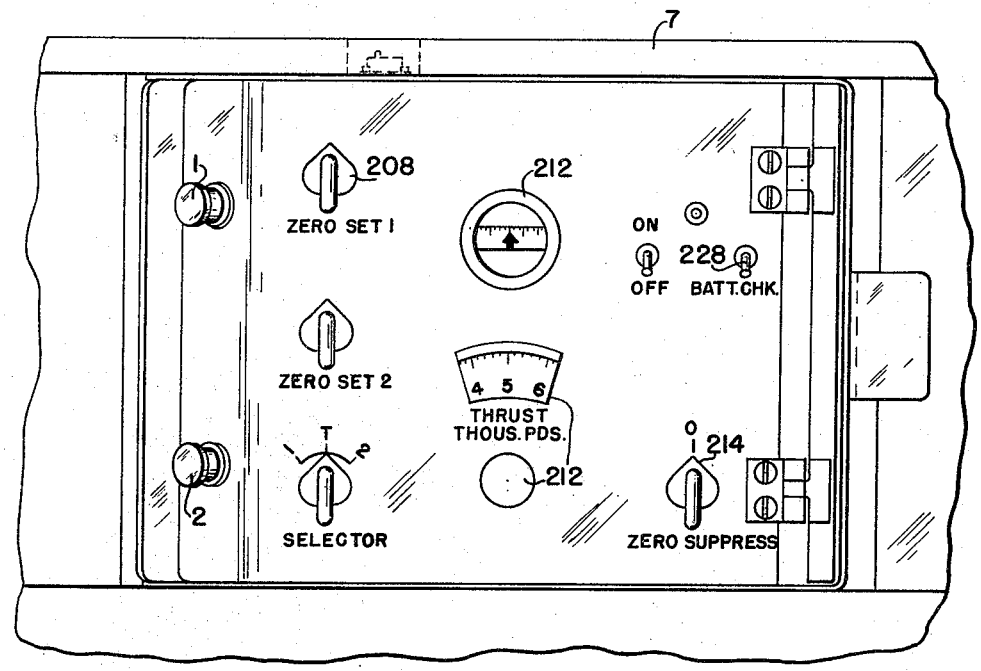
Figure 12 is a view illustrating the recording meter.

To retain the platform against swivelling or out of line motion relative to the lower plates the rear and forward edges 27 and 28, respectively, of platform 15 each have a recess at the center of the platform (Figure 12); a resilient cross bar 101 (Figures 3 and 4) extends across the rear of the platform and is secured thereto in a central recess at 103, the ends of the bar being secured to handles 105 and 107, respectively, or to a cast portion of the base itself. This bar is spaced from edge 106 of the base plate and has sufficient resiliency to readily permit of the required .015" of platform movement and accordingly only an inconsiderable swivel may take place which is readily self adjusted under load by the freedom of movement in the tension member assembly. Similarly bar 109 forward of the platform is secured centrally thereto at 111 and the bar ends are secured to handles 113 and 115 (Figure 11). These bars 101 and 109 in combination effectively prevent swivelling of the platform and offer substantially no resistance to backward and forward motion of the plate.

Channel 65 as has been noted is closed by neoprene stripping 70 against the entrance of moisture. However in order to suitably provide for removal of water which may enter the unit on the outer side of these strips drains 112 are provided at intervals around the periphery of the assembly.

In the operation of the thrust measuring device the airplane is rolled up the ramp 11 of a pair of the devices and secured in position with wheels locked as shown in Figure 1. The electrical connections to the amplifier meter 7 are made and the plane's power is turned on.

The plane since the wheels are locked and firmly held on platform 15 will then tend to move forward as a unit and platform 15 will be urged forwardly placing bar 71 in tension. Cross bars 109 will then tend to straighten while cross bar 101 will tend to assume a slightly greater curvature than it had originally possessed. The movement and stress of these bars is however substantially nil and the platform motion will be unrestricted thereby.

The roller bearing units which support the vertical load will in their motion tend to compress the forward neoprene strips 37 and 41. This compression however affords no material resistance to the bearing or platform motion since the movement is a maximum of .015" which is absorbed without energy loss by a thick strip.

Referring briefly to the electrical circuit adapted to measure the above described movement there is shown in Figure 14 at 200 a bridge circuit having resistors indicated at 201, 202, 203 and 204. Resistors 201, 202 represent the strain gauges which extend along the axis of the tension member 71 while resistors 203, 204 represent the strain gauges extending around the circumference of member 71; it will thus be noted that when tension member 71 is in tensive strain that two of the resistors (strain gauges 201, 202) will increase in resistance since they are in tensive stress; the decrease in circumference of member 71 under the stress will place the other resistors (strain gauges) 203, 204 in compression thus decreasing their resistance. Accordingly by applying stress to member 71 when bridge 200 is balanced the bridge will become unbalanced.

Bucking the output of bridge 200 is the output of bridge 207 having fixed resistors 210; the signal output appearing between these bridges is applied to input transformer 216 of a standard amplifier 218 and the output of this latter component is directed to a phase detector circuit 220; oscillator circuit 222 also feeds into phasing circuit 220 and thereby the output of amplifier 218 is compared for phase with the standard reference voltage derived from the oscillator circuit 222.

Oscillator 222 also provides a standard A. C. voltage preferably of 1000 cycles to bridges 200 and 207.

The output of the phasing circuit is a D. C. voltage, the polarity of which depends on the comparison of the signal with respect to the reference oscillator signal with regard to phase; accordingly the milliameter 224 which receives the D. C. voltage output serves as a null indicator and the pointer thereof will swing left or right of center depending upon the D. C. polarity. This affords a visual indication of the manner in which element 212 must be adjusted.

Figure 15 illustrates at 246, 248 and 250 the customary arrangement of the electron tube filaments in circuit.

A source of power indicated at 226 provides a supply for a dynamotor; contact 228 provides means for checking the battery supply (24 v.) since the battery may be connected thereby through meter 224 to afford a visual indication of the battery capacity.

Bridge 230 is similar to bridge 200 and resistors 232, 234, 236, 238 are the strain gauges associated with the platform of the second wheel of the plane. The bridges 200 and 230 are so arranged as to have their outputs measured individually by means of gang switching arrangements 240 and 242 or the summation of the signals may be measured by providing connection through gang switch 244.

Considering the operation of the device, with the airplane mounted on the platforms but not powered, and dial 212 zeroed switch 228 is first flicked to check the power supply 226; the dynamotor switch is then thrown to on and oscillator 222 may feed a 1000 cycle signal to each of bridges 207, 200 and 230; with this condition and the output of one platform to be measured at a time, say that represented by bridge 200 the zero suppress control 214 (Figures 12 and 14) is adjusted to zero, balancing bridge 207; with scale 212 zeroed and the selector switch thrown to 1 to place bridge 200 in circuit, zero set control 1, that is knob 208 is adjusted to balance bridge 200 in the no load condition. Bridge 230 may be similarly balanced.

The airplane engines are then placed in operation with the plane wheels rigidly held as noted hereinbefore and the thrust of the plane will be taken completely by the tension members 71. The change in resistance of the strain gauges will then cause an unbalance of bridge 200 resulting in a voltage output which is fed through input transformer 216, amplified and compared with the oscillator output whereby the meter 224 is actuated. The reading of meter 224 indicates the direction in which member 212 (Figures 13 and 14) must be adjusted to buck out the output of bridge 200. Thus the dial associated with member 212 will indicate directly the total stress taken by tension member 71; similarly by moving gang switch 240 to 242 the thrust on the second tension member may be attained or if desired the total thrust may be attained by connecting the bridges through 244.

Figure 13:
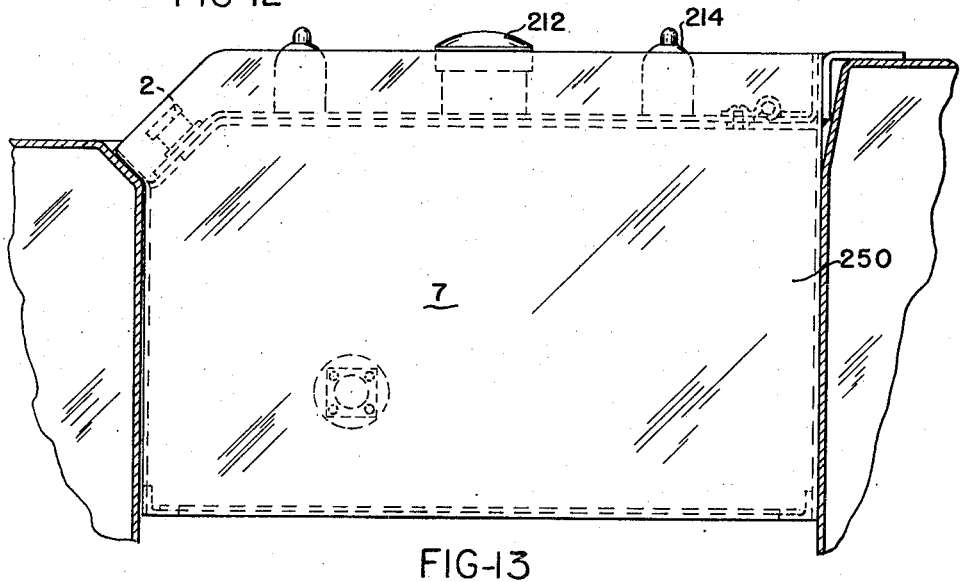
Figure 13 is an elevational view of the structure of Figure 12.

As the electronic meter will be exposed to atmospheric conditions the switch board is preferably recessed as indicated in Figure 13 in cabinet 250 and a cover is provided therefor.

In summary applicant has described a device particularly adapted for measuring the thrust of extremely heavy power units which device comprises a base plate and platform spaced apart by bearings which provide a very large bearing area, the platform and plate being joined together by a tension member having the axis thereof extending in the direction in which the platform is movable; the movement of the platform is very slight 0.015″ and substantially no resistance to the movement is offered by the thin resilient strips which bound the bearings even though the strips may be slightly compressed. The platform is cradled against swivelling movement by resilient rods which likewise may move the required 015″ without affording resistance to the plate. The strain is taken then entirely by the tension member which is provided with strain gauges which form a bridge circuit the output of which is bucked against the output of a bridge circuit having standard resistive elements. Thus the actual thrust is measured directly and readily without the necessity of calculation of any kind.

It will be understood that this invention is susceptible to modification in order to adopt it to different usages and conditions and accordingly, it is desired to comprehend such modifications within this invention as may fall within the scope of the appended claims.

I claim:

1. In a thrust measuring device capable of sustaining high loading in a direction transverse to the thrust a base plate, a platform supported movably on said base plate, a tension member assembly secured between said plate and platform and extending in the direction of movement of said platform, and bearings covering substantially the whole working area between said base and platform whereby the said platform is movably supported, the tension member assembly comprising a pair of spaced blocks having a force sensing member secured therebetween, one of said blocks being secured to said platform and limitedly movable with respect to said base plate for alignment of said sensing member in the direction of movement, and the other of said blocks being secured to said base plate.

2. In a thrust measuring device capable of sustaining high loading in a direction transverse to the thrust a base plate, a platform supported movably on said base plate, a tension member assembly secured between said plate and platform and extending in the direction of movement of said platform, and cylindrical roller bearings covering substantially the whole working area between said base and platform whereby the said platform is movably supported, the tension member assembly comprising a pair of spaced blocks having a force sensing member secured therebetween, one of said blocks being secured to said platform and limitedly movable with respect to said base plate for alignment of said sensing member in the direction of movement, and the other of said blocks being secured to said base plate.

3. In a thrust measuring device a base plate, a platform having forward and aft edges and supported movably on said base plate and movable transversely to the forward and aft edges, bearing means between the platform and base plate supporting the platform on the base plate, means to align the platform on the base plate for said movement of the platform, and a pair of resilient means one engaging said platform centrally at the forward edge and the other engaging said platform centrally at the aft edge thereof and each including arms which are secured to said base plate laterally of said platform whereby swivelling movement of said platform is restrained.

4. In a thrust measuring device a base plate, a platform having a forward and rear edge supported movably on said base plate for movement transversely to the forward and rear edges, roller bearings between said base plate and platform providing the support for the latter, a pair of resilient cross bars extending laterally of said platform, means securing one said bar to the forward edge of said platform centrally of the width thereof, means securing the other said bar to the rear edge of said platform centrally thereof, means securing the extremities of each of said bars to said base plate, and means secured to the platform extending thereacross aligning the bearings for said movement.

5. In a thrust measuring device a base plate, a platform extending substantially parallel to the base plate, bearings extending laterally of the base plate and platform and movably supporting said platform on said base plate for limited movement in a direction transverse to that in which the bearings extend, said platform having a pair of bottom recesses laterally extending and having some of said bearings positioned therebetween, projections of said base plate extending into said recesses, a tension member secured between said plate and platform in the planes thereof and extending substantially perpendicularly to said projections whereby said projections would inhibit the movement of said platform upon failure of said tension member.

6. In a thrust measuring device having a fixed base plate and a platform, roller bearings extending laterally of said platform and said base plate and positioned therebetween and movably supporting the platform with respect to the base plate for movement of the platform in a plane transverse to that in which the bearings extend, a tension member assembly secured between said plate and platform comprising a pair of spaced blocks having a force sensing member secured therebetween, one of said blocks being secured to said platform and limitedly movable with respect to said base plate for alignment of said sensing member in the direction of movement and the other of said blocks being secured to said base plate.

7. In a thrust measuring device having a fixed base plate and a platform movable with respect thereto, roller bearings extending laterally of said platform and said base plate and positioned therebetween and movably supporting the platform with respect to the base plate for movement of the platform in a plane transverse to that in which the bearings extend, a tension member assembly secured between said plate and platform comprising a pair of spaced apertured blocks having a force sensing member secured therebetween, one of said blocks having a cylindrical member positioned in an aperture thereof and secured to said platform for alignment of said sensing member in the direction of movement, and the other of said blocks having a cylindrical member positioned in an aperture thereof and secured to said base plate.

8. In a thrust measuring device a base plate, sets of roller bearings extending laterally of said base plate, a platform supported on said roller bearings and movable thereover with respect to said base plate, a tension member secured between said base plate and platform and extending in the direction of movement of said platform, the end roller bearing of a set having a thin resilient aligning strip which offers substantially zero resistance to platform movement, said aligning strip being secured to the platform and extending thereacross coincident with the end roller bearing.

References Cited in the file of this patent

UNITED STATES PATENTS

| | | |
|---|---|---|
| 1,611,099 | Boyer | Dec. 14, 1926 |
| 1,981,613 | Duby | Nov. 20, 1934 |
| 2,190,833 | Fowler | Feb. 20, 1940 |
| 2,340,228 | Scharnberg | Jan. 25, 1944 |
| 2,611,266 | Wiancko | Apr. 29, 1948 |
| 2,513,295 | Eisenberg | July 4, 1950 |
| 2,561,318 | Ruge | July 17, 1951 |
| 2,596,048 | Severs | May 6, 1952 |

FOREIGN PATENTS

| | | |
|---|---|---|
| 111,215 | Sweden | July 18, 1944 |